(12) United States Patent
Donner (10) Patent No.: US 7,546,265 B1
(45) Date of Patent: *Jun. 9, 2009

(54) INTELLECTUAL PROPERTY AUDIT SYSTEM GENERATING A MACHINE IMPLEMENTED ESTIMATED VALUE COMPRISING A FINANCIAL QUALITY AND/OR FINANCIAL QUANTITY OF AN INTELLECTUAL PROPERTY PORTFOLIO

(76) Inventor: Irah H. Donner, 11601 Yeatman Ter., Silver Spring, MD (US) 20902

( * ) Notice: Subject to any disclaimer, the term of this patent is extended or adjusted under 35 U.S.C. 154(b) by 1548 days.

This patent is subject to a terminal disclaimer.

(21) Appl. No.: 10/412,238

(22) Filed: Apr. 14, 2003

Related U.S. Application Data (63) Continuation of application No. 09/839,301, filed on Apr. 23, 2001, which is a continuation of application No. 09/518,681, filed on Mar. 3, 2000, now Pat. No. 6,263,314, which is a continuation of application No. 08/811,302, filed on Mar. 4, 1997, now Pat. No. 6,154,725, which is a continuation-in-part of application No. 08/161,816, filed on Dec. 6, 1993, now Pat. No. 5,999,907.

(51) Int. Cl.
  *G06Q 40/00* (2006.01)
(52) U.S. Cl. .......................... 705/36; 705/30
(58) Field of Classification Search ............. 705/10–44; 707/10, 100
  See application file for complete search history.

(56) References Cited

U.S. PATENT DOCUMENTS

| | | |
|---|---|---|
| 3,810,101 A | 5/1974 | Avery |
| 3,820,080 A | 6/1974 | Abrams et al. |
| 3,911,403 A | 10/1975 | O'Neill, Jr. |
| 4,012,720 A | 3/1977 | Call et al. |
| 4,064,490 A | 12/1977 | Nagel |
| 4,334,270 A | 6/1982 | Towers |

(Continued)

FOREIGN PATENT DOCUMENTS

EP  649074 A1  4/1995

(Continued)

OTHER PUBLICATIONS

Chiesa, et al. "Searching for factors influencing technological asset value", European Journal of Innovation Management, v10n4, pp. 567-488, 2007, Dialog file 15, Accession No. 03448772.*

(Continued)

*Primary Examiner*—Frantzy Poinvil
(74) *Attorney, Agent, or Firm*—Thomas, Kayden, Horstemeyer & Risley, LLP (57) ABSTRACT

An intellectual property computer-implemented audit system for valuing an intellectual property portfolio includes a first database storing first information relating to the intellectual property portfolio and a database access and collection device connected to the first database and accessing the first database and retrieving the first information. In addition, the intellectual property audit system also includes a second database storing empirical data relating to known intellectual property portfolios, and a comparison device connected to the database access and collection device and to the second database, the comparison device receiving the first information from the database access and collection device and comparing the first information to the empirical data retrieved from the second database producing an intellectual property worth indicator indicating the worth of the intellectual property portfolio.

38 Claims, 8 Drawing Sheets

U.S. PATENT DOCUMENTS

| | | | |
|---|---|---|---|
| 4,638,422 | A | 1/1987 | Rees |
| 4,670,848 | A | 6/1987 | Schramm |
| 4,814,988 | A | 3/1989 | Shiotani et al. |
| 4,831,526 | A | 5/1989 | Luchs et al. |
| 4,965,763 | A | 10/1990 | Zamora |
| 4,975,840 | A | 12/1990 | DeTore et al. |
| 5,146,541 | A | 9/1992 | Speidel |
| 5,163,131 | A | 11/1992 | Row et al. |
| 5,220,500 | A | 6/1993 | Baird et al. |
| 5,303,330 | A | 4/1994 | Gersho et al. |
| 5,754,840 | A | 5/1998 | Rivette et al. |
| 5,774,833 | A | 6/1998 | Newman |
| 5,991,751 | A | 11/1999 | Rivette et al. |
| 6,330,547 | B1 * | 12/2001 | Martin ........................ 705/38 |
| 6,556,992 | B1 * | 4/2003 | Barney et al. .................. 707/6 |

OTHER PUBLICATIONS

Anson, "Ways to put a value on a trademark", Corporate Finance, n144, pp. 36-39, Nov. 1996, ISSN: 0958-2053, Dialog file 15, Accession No. 01350073.*

Petrash, Gordon, "New Pressures on Valuing Acquired Intangibles." http://www.delphion.com/news_stories/news-petrash_article, printed Oct. 24, 2003. pp. 1-4.

Woodward, Caroline, "Accounting for intellectual property." http://www.buildingipvalue.com/c_finance/woodward.html, printed May 30, 300, 2003. pp. 1-5.

Haller, Mark and Edward Gold, "Avoiding transaction peril: value-based IP due diligence." http://www.buildingipvalue.com/c_finance/haller.html, printed May 30, 2003. pp. 1-6.

Suchy, Donna, "Taking It to the Next Step." *IP Newsletter*, vol. 21, No. 3. Spring 2003. pp. 32-33 & 51.

Ackerman, Jason et al., "Portfolio Mining—Actively Managing Your Intellectual Property." *The Conference Board Conference on IAM*. Jun. 27, 2001. 85 pages.

O'Shaughnessy, Jim and Pat Sullivan, "Valuing Knowledge Companies for Mergers and Acquisitions." *Licensing Executives Society*. Oct. 27, 1998.

Hayes, John P., "Computer Architecture and Organization", McGray-Hill Publishing Company, Section Edition, before Mar. 1997.

Spidalpff et al., Shoppers guide to legal document assembly (document assembly software . . . ), Law Office Comput8ing 7 n5 68(18, ISSN: 1055-128X, Dialog file 150, Accession No. 16427546, before Mar. 1997.

Barroso, L. A. et al., "RPM: A Rapid Prototyping Engine for Multiprocessor Systems", IEEE, 1995, pp. 26-34.

"Where Buses Cannot Go", IEEE Spectrum, Feb. 1995, pp. 41-45.

"Acxiom, Fair Isaac developing risk management software", *American Banker*, v159, n108, p. 17(1), Jun. 7, 1994, Dialog file 148, Accession No. 07298629.

Ralston, A. et al., Rienhold, Van Nostrand, "Encyclopedia of Computer Science", 1993, pp. 904-907.

"The Global Patent Race Picks Up Speed", Science & Technology, Aug. 9, 1993, pp. 57-62.

Tammi, "Patent Enforcement Policy Aids Technology Transfer", *Technology Access Report*, Mar. 15, 1990, Dialog file 636, Accession No. 00921722.

Vigil, Robert L., "Valuing Intellectual Property: Determining the Appropriate Royalty Rate", Presentation to: AIPLA Spring Meeting Licensing Committee.

Rivette, Kevin G. & David Kline, "Rembrandts in the Attic", Harvard Business School Press. Chapter 1.

Anson, Weston, "Valuing IP Assets in Bankruptcy", *IPL Newsletter*, vol. 21, No. 2. Winter 2003.

Zilka, Kevin J., Dominic M. Kotab & Christopher J. Hamaty, "Competitive Intelligence and Its Role in Increasing the Value of a Patent Portfolio", *Intellectual Property Today*, Jan. 2003.

Ch'ang, Sharyn & Marina Yastreboff, "How to identify your invisible advantage", www.managingip.com.

Barney, Jonathan A., "A Study of Patent Mortality Rates: Using Statistical Survival Analysis to Rate and Value Patent Assets", *AIPLA Quarterly Journal*, Summer 2002. vol. 30, No. 3, pp. 317-352.

McCurdy, Dan & Marshal Phelps, "Why exclusion is not profitable", www.managingip.com, Nov. 2002.

"Intellectual property: Partnering for profit", *McKinsey Quarterly*, www.cnet.com, Nov. 23, 2002.

Hagelin, Ted, "A New Method to Value Intellectual Property", *AIPLA Quarterly Journal*, Summer 2002. vol. 30, No. 3, pp. 353-403.

Kedrowski, Kathleen M. & Jennifer L. Knabb, "An In-Depth Look at Historical Patent and Trademark Damages Trends", *IPL Newsletter*, Spring 2002. vol. 20, No. 3.

Slaughter, Darlene, "Patenting Activity as an Indicator of Revenue Growth: Five Industries", *The Patent Journal*, Apr. 2002.

Berman, Bruce & James D. Woods, "Positioning IP for shareholder value", www.managingip.com. Mar. 2002.

"Think NASDAQ", Thomas Derwent 2002.

Murtha, Emmett J., "Advanced Licensing Agreements: Finding IP with Licensing Value", 2002.

Sullivan, Patrick H. Sr., "Introduction to Licensing Portfolio Evaluation".

Chambers, Guy W. and Brian T. Naylor, "Hot Issues in Patent and Technology Licensing—2002", 2002.

Hotwitz, Ethan, Esquire and Jessica Jamieson, Esquire, "Patents, Technology and License Agreements".

Astrachan, James B., "The intellectual property audit: A critical service", *The Daily Record*, Nov. 3, 2001. vol. 113, Nov. 28.

Barney, Jonathan A., "Comparative Patent Quality Analysis: A Statistical Approach for Rating and Valuing Patent Assets", Patent Ratings, LLC, 2001.

Wells, William K., "Valuation Strategies for IP Assets", *Valuation Strategies for IP Assets*, Kenyon & Kenyon, 2001.

"Intellectual Assets—Value Development & Extraction".

Godwin, Mike and Victoria Slind-Flor, "They Got a Winner There", *Legal Times*, Oct. 8, 2001.

Harrison, Suzanne, "How Leading Companies Realize Value from Their Intellectual Assets", 2001.

Neifeld Richard A. Ph.D, "A Macro-Economic Model Providing Patent Based Company Financial Indicators and Automated Patent Valuations", *Intellectual Property Today*, Oct. 2001.

Barney, Jonathan A., "Comparative Quality Analysis: A Statistical Approach for Rating and Valuing Patent Assets", *The Valuation Examiner*, Sep./Oct. 2001.

Holmes, Stephen C. and William L. Anthony, Jr., "Time for an IP Audit?", *Intellectual Property Today*, Aug. 2001.

Clement, Zack, Jonathan Bolton, and Carmen R. Eggleston, "How to restructure technology-rich companies", *Managing Intellectual Property*, Jul./Aug. 2001.

Mahoney, Bill, "Smart As", *Shareholder Value*, May/Jun. 2001.

Blonder, Brian and Edward Gold, "Negotiating Intellectual Property Transactions", *IPLF IAM Pre-Conference*, Feb. 21, 2001.

Burton, Bruce, "Strategic Role of Intellectual Property in Company Valuation and Financing", Feb. 12, 2001.

Neifeld, Richard A., "A Macro-Economic Model Providing Patent Valuation and Patent Based Company Financial Indicators".

Lamont, Judith, "Tour the changing IP landscape", *KMWorld*, 2001.

Bischoff, Glenn, "The new mantra: innovate, protect and leverage—or lose", *Telephony*, May 7, 2001.

Samuel, Tony, "The value of protection", *Managing Intellectual Property*, Nov. 2000.

Schutz, Ronald J., Diane L. Simerson, "Due Diligence in Intellectual Property Transactions", 2000.

Krosin, Kenneth E., "Strategies in Creation of Intellectual Property", 2000.

Rivette, Kevin G. and David Kline, "Discovering New Value in Intellectual Property", *Harvard Business Reveiw*, Jan.-Feb. 2000.

Davis, Julie, "Using Your IP to Increase Shareholder Value", *AIPLA 2000 Annual Meeting*, Oct. 20, 2000.

Mard, Michael and James Rigby, "Intellectual Property Valuations Increasingly Important", *Judges & Lawyers Business Valuation*, Sep. 2000. vol. 2, Issue 9.

"Private Profiles: Aurigin Systems, Helping companies pan for gold in an ocean of patents", *Business Issues in Technology, Computer Letter*, May 15, 2000. vol. 16, No. 16.

Hill, David W., "How to Value Business Method Patents", *AIPLA Japan Practice Committee, JPAA Seminar*, Apr. 5, 2000.

Rappaport, Alfred, "Ten Pointers for Investing In Internet Stock", *The Wall Street Journal*, Feb. 24, 2000.

Dobrusin, Eric M., Jerry W. Mills, Tom G. Powell, Bryan Benoit, Mark W. Haller and Albert A. Vondra, "How Do I Convert to Cash?", *PricewaterhouseCoopers LLP, Intellectual Property Leadership Forum*, Feb. 23-26, 2000.

Lawton George, "Intellectual-Property Protection Open Path for E-commerce", Feb. 2000.

Clark, David, "Shopbots Become Agents for Business Change", Feb. 2000.

Deng, Zhen, Baruch Lev, and Frances Narin, "Science and Technology as Predictors of Stock Performance", May/Jun. 1999.

Pooley, James and Elizabeth M. Day, "After the Gold Rush", May 1999.

"Buyout Firms Undervalue Intellectual Property", *Market Spotlight*, Mar. 22, 1999.

Bramson, Robert S., "Valuing Patents, Technologies and Portfolios: Rules of Thumb", 1999.

"Trends in Proprietary Information Loss", ASIS and PricewaterhouseCoopers, 1999.

Ed Phelps and Steven S. Barbarich, "Patent Licensing and Royalty Rules", 1996.

* cited by examiner

INTELLECTUAL PROPERTY AUDIT SYSTEM GENERATING A MACHINE IMPLEMENTED ESTIMATED VALUE COMPRISING A FINANCIAL QUALITY AND/OR FINANCIAL QUANTITY OF AN INTELLECTUAL PROPERTY PORTFOLIO

RELATED APPLICATIONS

This application is a continuation application of U.S. application Ser. No. 09/839,301 filed on Apr. 23, 2001, which in turn is a continuation application of U.S. application Ser. No. 09/518,681 filed on Mar. 3, 2000 now U.S. Pat. No. 6,263,314, which in turn is a continuation application of U.S. application Ser. No. 08/811,302 filed on Mar. 4, 1997 now U.S. Pat. No. 6,154,725, which in turn is a continuation-in-part application of U.S. patent application Ser. No. 08/161,816 filed on Dec. 6, 1993 now U.S. Pat. No. 5,999,907, all of which are hereby incorporated herein by reference.

BACKGROUND OF THE INVENTION

1. Field of the Invention

The present invention generally relates to the field of intellectual property audit systems, and more particularly, to the field of intellectual property systems which collects pertinent data regarding an intellectual property portfolio and analyzes the collected data against empirical data to provide a qualitative and/or quantitative analysis of the intellectual property portfolio.

2. Description of the Related Art

In general, purchasers of assets which are intellectual property intensive typically purchase these assets based upon some estimated value which, of course, begins with an offer for sale. When a creditor is considering advancing funds based upon the value of fixed assets, such as equipment, an appraisal is performed and a liquidation value is determined. Then a liquidity adjustment is considered and a liquidation value is concluded. The same valuation approaches can be employed to determine the liquidation value of intellectual property. It is known to value intellectual property assets with respect to various accounting procedures which conform to Generally Accepted Accounting Procedures (GAAP). There are typically three such procedures: cost, market and income approaches.

The cost approach gives consideration to the cost to reproduce or replace the subject intellectual property. For example, for patent intellectual property, this approach would consider the cost associated with research, engineering, design and testing activities. In trademark cases the advertising expenses that would be needed to create a trademark of similar prominence would be considered.

From this amount an allowance is deducted to reflect all forms of depreciation or obsolescence present, whether it arises from physical, functional or economic causes. Physical deterioration (depreciation) is the loss in value resulting from wear and tear from operations and exposure to the elements. Functional obsolescence is the loss in value within the property as a result of such things as changes in design, materials, or processes, overcapacity, inadequacy, excess construction, lack of utility, and excess operating cost. Economic obsolescence is the loss in value that results from influences external to the property such as the general state of economy, the effect of governmental regulations, and the like. A summary of the cost approach is presented below.

| Replacement cost | |
|---|---|
| Less: | Physical Depreciation |
| Less: | Functional Obsolescence |
| Less: | Economic Obsolescence |
| Equals: | Fair Market Value |

Physical and functional obsolescence is not usually an important factor when valuing intellectual property but care is needed to consider the economic obsolescence that can be introduced by outside forces.

Unfortunately the cost to develop intellectual property rarely bears any relationship to the economic earning power of the property or the value of the property.

The market approach gives consideration to prices paid for similar property in arm's length transactions. Adjustments can be made, if necessary, to the indicated market prices to reflect the condition and utility of the property being appraised relative to the market comparative. This approach is applicable where there is an active market with a sufficient quantity of reliable and verifiable data. Usually, similar property that exchanged between independent parties for which price data is disclosed is impossible to find for intellectual properties. The activities of the Resolution Trust Corporation are however beginning to provide some of the previously missing data. At present, the market approach is difficult to implement for intellectual property.

The income approach, by default, is still the most preferred method. It considers the present value of the prospective economic benefits of owing the appraised property. This involves a capitalization of the forecasted income stream with consideration given to the duration of the income and the risks related to its achievement.

Care must be employed to assure that economic benefits derived from the intellectual property are isolated from the contribution to earnings derived from the complementary assets of the business. When properly done, the income approach can provide an accurate indication of the fair market value of intellectual property. Once the fair market value of the intellectual property portfolio has been determined, then as indicated above, the fair market value is adjusted according to conventional methods which consider effects such as amount of time required to dispose of the portfolio, market evidence of similar intellectual property portfolios sold in liquidation and cost to liquidate the property.

These accepted accounting methods rely or function on the availability of sufficient data relating to the intellectual property portfolio itself. Thus, in this situation, the seller of the intellectual property portfolio typically has used and marketed the intellectual property over a sufficiently long time period that suitable data has been collected to formulate a price based upon one of the above accounting valuation techniques. However, these accounting techniques typically do not provide reliable and/or dependable valuation results when the seller of the intellectual property portfolio has not collected data or has not used or marketed the portfolio long enough to obtain such data.

In addition, for typical purchases of intellectual property assets, there is typically unavailable an independent indicator of the worth of the intellectual property to be sold. The independent indicator which is lacking may be either a qualitative or quantitative indicator of the worth of the intellectual property portfolio.

Accordingly, it is desirable to provide an independent analysis of an intellectual property portfolio including an independent qualitative or quantitative worth indicator of the intellectual property portfolio to be acquired.

In addition, it is also desirable to provide an intellectual property audit system that does not depend on the owner of the portfolio having previously used and marketed the portfolio.

It is further desirable to provide an intellectual property audit system which can be used to determine the qualitative and/or quantitative value of the intellectual property portfolio in an efficient and relatively rapid manner.

It is also desirable to provide the qualitative and/or quantitative value by analyzing the intellectual property itself in a mechanized manner as well as considering external factors relating to, for example, characteristics of the purchasing and selling entities.

Finally, it is also desirable that the intellectual property audit system be provided with the ability to output requests for manual assistance to correct, for example, erroneously entered data or incomplete or insufficient data causing the intellectual property audit system to be unable to completely analyze the input data for determining of an intellectual property portfolio value. Accordingly, the audit system permits a user to manually correct or complete data to permit the audit system to determine a qualitative and/or quantitative intellectual property portfolio value.

SUMMARY OF THE INVENTION

It is, therefore, an object of the present invention to provide an independent analysis of an intellectual property portfolio including an independent qualitative or quantitative worth indicator of the intellectual property portfolio to be acquired.

It is also an object of the present invention to provide an intellectual property audit system that does not depend on the owner of the portfolio having previously used and marketed the portfolio.

It is also an object of the present invention to provide an intellectual property audit system which can be used to determine the qualitative and/or quantitative value of the intellectual property portfolio in an efficient and relatively rapid manner.

It is another object of the present invention to provide the qualitative and/or quantitative value by analyzing the intellectual property itself in a mechanized manner as well as considering external factors relating to, for example, characteristics of the purchasing and selling entities.

Further, it is an object of the present invention that the intellectual property audit system be provided with the ability to output requests for manual assistance to correct, for example, erroneously entered data or incomplete or insufficient data causing the intellectual property audit system to be unable to completely analyze the input data for determining of an intellectual property portfolio value. Accordingly, the audit system permits a user to manually correct or complete data to permit the audit system to determine a qualitative and/or quantitative intellectual property portfolio value.

To achieve these and other objects, the present invention provides an intellectual property computer-implemented audit system for valuing an intellectual property portfolio. The intellectual property audit system includes a first database storing first information relating to the intellectual property portfolio and a database access and collection device connected to the first database and accessing the first database and retrieving the first information. In addition, the intellectual property audit system also includes a second database storing empirical data relating to known intellectual property portfolios, and a comparison device connected to the database access and collection device and to the second database, the comparison device receiving the first information from the database access and collection device and comparing the first information to the empirical data retrieved from the second database producing an intellectual property worth indicator indicating the worth of the intellectual property portfolio.

These together with other objects and advantages which will be subsequently apparent, reside in the details of construction and operation as more fully hereinafter described and claimed, with reference being had to the accompanying drawings forming a part hereof, wherein like numerals refer to like elements throughout.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The intellectual property audit system according to the present invention may be used as an integrity check for acquisitions having assets involving a substantial intellectual property portfolio. The system could be used to compare the intellectual property portfolio to be acquired with other intellectual property portfolios having known market values to obtain an indicator of the intellectual property portfolio's worth. Depending on the quality of empirical data, the intellectual property audit system of the present invention could provide a qualitative and/or quantitative analysis of an intellectual property portfolio which is to be acquired.

Figure 2:
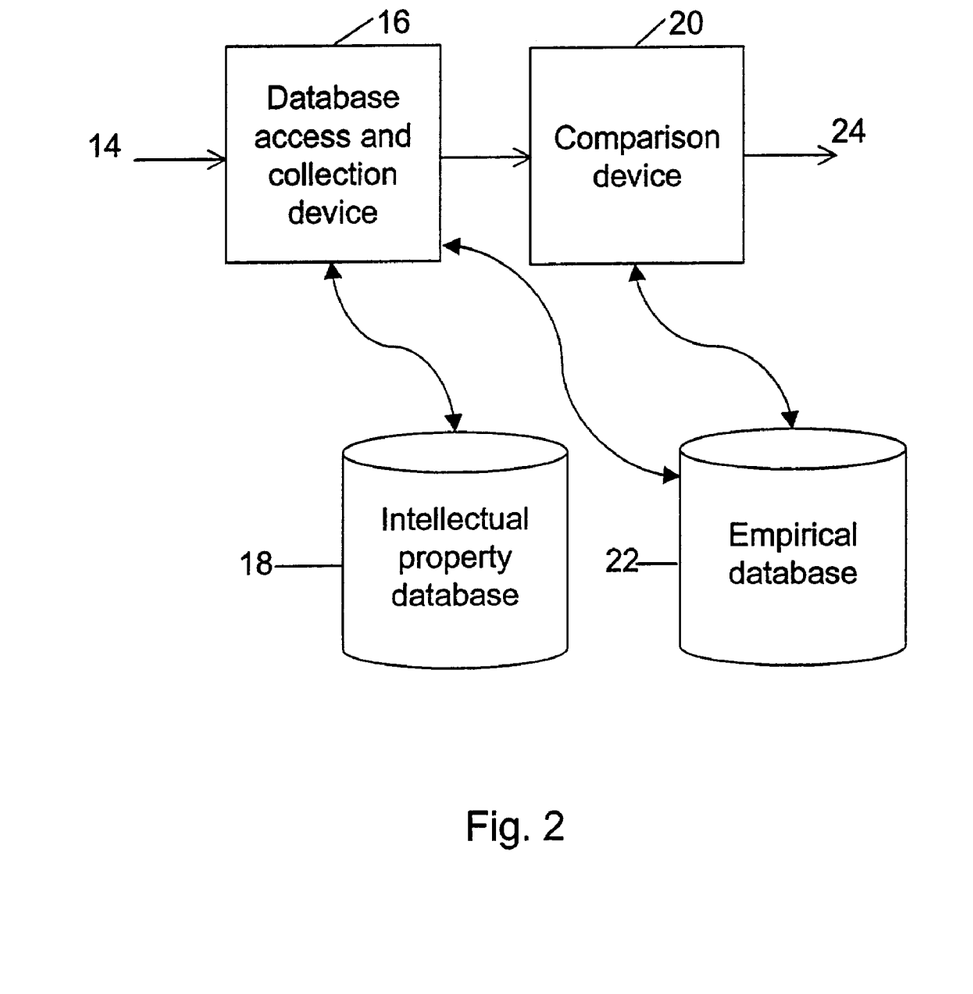
FIG. 2 is a conceptual diagram of the intellectual property audit system of the present invention.

FIG. 2 is a conceptual diagram of the intellectual property audit system of the present invention. The intellectual property audit system would operate in general terms as follows. In FIG. 2, the user of the audit system would input the appropriate data to an input device 14. In the most basic form, the input data might simply be a list of patent numbers for an intellectual property portfolio comprising only patents.

Next, the data would be transmitted to a database access device 16 which would collect various data from different on-line intellectual property databases 18. The collected data represents different intellectual property worth indicators. Each worth indicator would then be assigned a value which would be approximated using previously collected indicator values which are based on intellectual property portfolios which have known worth or dollar values by consulting empirical database 22. For example, the audit system could access a full text patent database such as DIALOG to analyze the listed patents. Specifically, the system could determine how many claims, dependent and independent, are in each patent. A high value would be assigned to this indicator is there are many claims, indicating that the drafter or owner of the patent considered the patent of significant importance. Additionally, the number of references cited or number of classes searched could also be gathered and a high value assigned to the indicator when the patent lists many classes or many cited references. The rationale for the high value would be that there is reason to believe that the examiner performed a detailed examination leaving the issued patent strong. Further, each patent could also be searched to determine how often the patent itself has been cited as a reference on other patents. Higher values would be assigned to a patent cited more often than not, indicating that the patent was perhaps a breakthrough in a particular field.

Similar information could also be collected for trademarks which are included in the intellectual property portfolio from such databases as DIALOG's FEDERAL TRADEMARK SCAN and STATE TRADEMARK SCAN which inventory federal and state trademarks, respectively. Based upon these databases, a user might, for example, determine whether a trademark includes disclaimers to certain words in the trademark and/or how many classes the trademark has been issued for or covers. In addition, ORBIT's LEGAL STATUS database includes recent information affecting the trademark, and LEXIS' NEXIS database could be used to determine any recent information relating to the trademark which has been published in trade magazines or newspapers.

Finally, intellectual property which also includes copyrighted work could also be considered in a similar manner. For example, computer software related intellectual property might include both patents on the computer system as well as copyrights on the software itself.

Once all the worth indicators have been determined, they are transmitted to an indicator comparing device 20 which would compare the collection of worth indicators to known collections of worth indicators from known intellectual property portfolios stored in empirical database 22. Known distribution or estimation techniques could be used to determine which known intellectual property portfolio the intellectual property portfolio which is to be acquired matches the closest. Finally, the system would output the known portfolio worth value 24 for which the portfolio to be acquired matches the most, signifying a rough approximation of the worth of the portfolio to be acquired. A detailed description of the intellectual property audit system according to the present invention follows.

Figure 1:
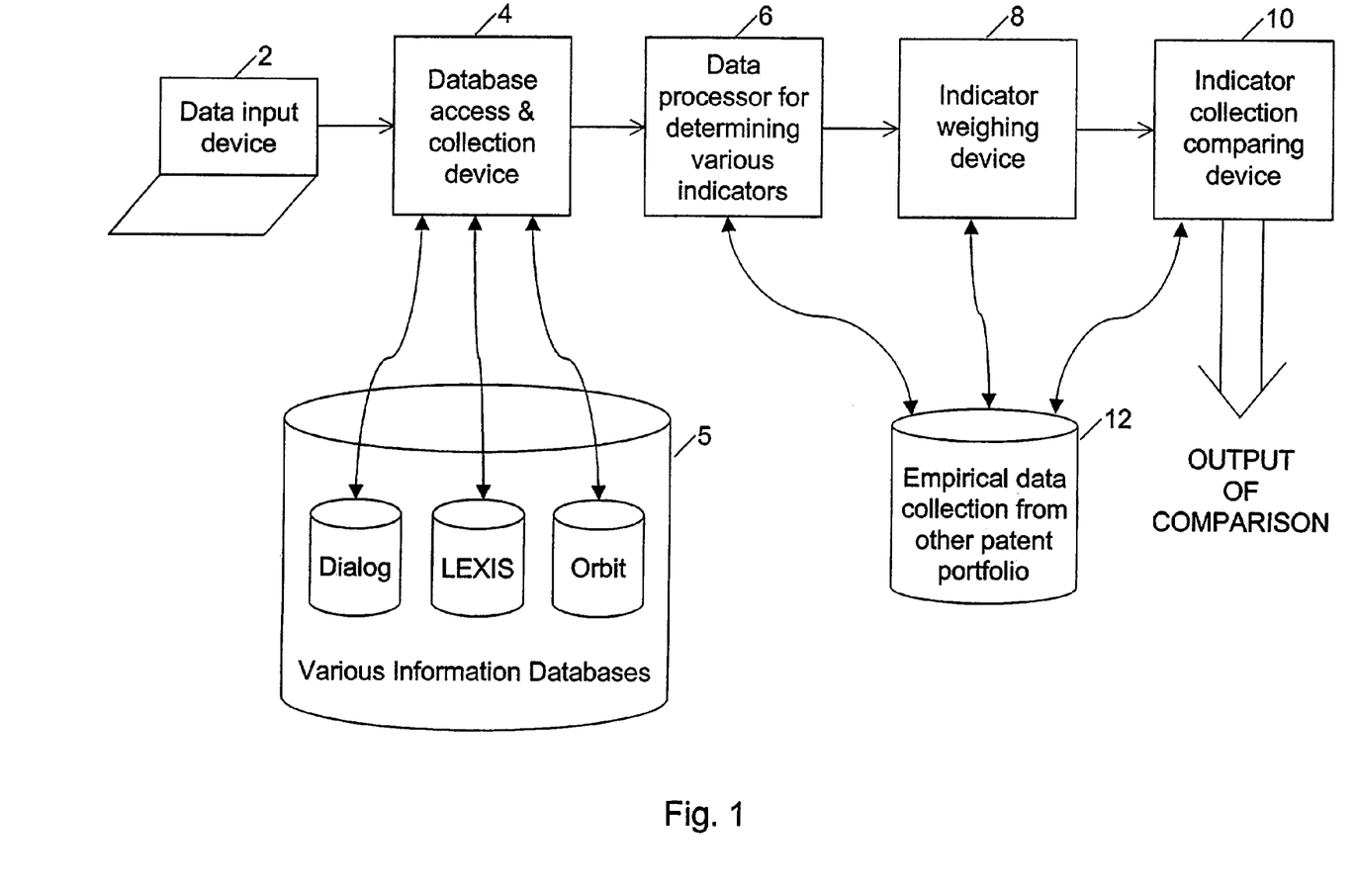
FIG. 1 is a detailed block diagram of the structure of the intellectual property audit system of the present invention.

FIG. 1 represents a block diagram representation of the proposed intellectual property audit system. In FIG. 1, data input device 2 is used to input the necessary data representing the intellectual property portfolio to be acquired. This data may be, for example, simply the list of patent numbers in the portfolio, or the data might include additional information relating to the specific intellectual property portfolio or the selling/acquiring entities which might not be readily retrievable from current databases. For example, the additional information might include financial information regarding the selling/acquiring entities or recent performance in the stock market. Data input device 2 is a standard input device and may include, for example, the data entry system in U.S. Pat. No. 4,012,720 or the data entry interface assembly in U.S. Pat. No. 4,638,422, incorporated herein by reference. In any event, the data is entered and then transmitted to database access and collection device 4.

Database access and collection device 4 filters the received data to determine which aspects of the received data are to be further analyzed by retrieving information regarding the data from various on-line databases. For example, database access and collection device 4 would determine that the received patent numbers should be used to analyze the patents while the received financial data might not be further analyzed and simply transmitted to data processor 6 for later evaluation.

With respect to the data which is to be analyzed, database access and collection device 4 will access the various databases having information concerning the data to be analyzed and collect the necessary information regarding the data. For example, with respect to the patent number information, database access and collection device 4 would access the ORBIT database to determine if the patent is currently involved in a pending litigation using such databases as the LITALERT Database, or whether the patent is under reexam or reissue using such ORBIT databases as LEGAL STATUS or PATENT STATUS. Database access and collection device 4 could also access the LEXIS/NEXIS database to determine whether any newspapers have published any current information regarding the patents as well as determining whether the patent has been involved in previous lawsuits by accessing the legal reporter files.

Finally, database access and collection device 4 can also access a full-text patent database such as DIALOG to either collect the necessary information directly from DIALOG or to obtain the patents themselves. The types of patent information which would provide important information could be of two forms. The first type of information would be patent information derived directly from the patents. Such information would include number of claims, the length of the independent claims, number of references cited, number of classes searched, whether the patent is a reissue or reexam, number of years until patent expires or in which group the patent was examined. In addition, the indicators may include whether the inventor(s) is a U.S. or foreign citizen, or whether the current owner is U.S. or foreign based. Further, information regarding U.S. or foreign priority, and whether the cited references have publication dates near the priority dates could also be considered.

The second type of information would not be derived from the patent itself, but would be information derived from other patents. For example, this information might be how often the patent being acquired has been cited as a reference for other patents.

Similar information could also be collected for trademarks which are included in the intellectual property portfolio from such databases as DIALOG's FEDERAL TRADEMARK SCAN and STATE TRADEMARK SCAN which inventory federal and state trademarks, respectively. Based upon these databases, a user might, for example, determine whether a trademark includes disclaimers to certain words in the trademark and/or how many classes the trademark has been issued for or covers. In addition, ORBIT's LEGAL STATUS database includes recent information affecting the trademark, and LEXIS' NEXIS database could be used to determine any recent information relating to the trademark which has been published in trade magazines or newspapers.

Finally, intellectual property which also includes copyrighted work could also be considered in a similar manner. For example, computer software related intellectual property might include both patents on the computer system as well as copyrights on the software itself.

Database access and collection device 4 may be any standard device which may interface with the various other databases using, for example, software which is able to mimic or compatible with the software systems of the various databases. Accordingly, database access and collection device 4 may include, for example, the data collection system in U.S. Pat. No. 3,810,101 or the information retrieval system in U.S. Pat. No. 4,064,490, incorporated herein by reference. Additionally, database access and collection device 4 may also include, for example, the machine translation system in U.S. Pat. No. 4,814,988 or the computer method for automatic extraction of commonly specified information from business correspondence in U.S. Pat. No. 4,965,763, incorporated herein by reference.

The collected information, including, for example, the first and second types of patent information discussed above, are then transmitted to data processor 6 to process the collected data. The data which does not require processing in data processor 6 may be simply passed to indicator weighing device 8. Data processor 6 would then process the collected data as follows: For each of the above indicators, data processor 6 would assign an importance factor, based upon predetermined data stored in empirical database 12, for each of the indicators indicating the importance of the collected data with respect to each indicator. Data processor 6 may include any standard data processor such as the 386 data processor manufactured by various companies including Intel and may include the various functions of the artificial intelligence system in U.S. Pat. No. 4,670,848, incorporated herein by reference.

Empirical database 12 may be a single database storing all the required empirical data, or empirical database 12 may be comprised of several smaller databases each storing different required data used by the intellectual property audit system of the present invention. Empirical database may be any standard database and may include, for example, the data storage and processing apparatus in U.S. Pat. No. 3,911,403, incorporated herein by reference.

For example, if data access and collection device 4 searched the DIALOG database and collects information that a specific patent has been cited over 100 times, i.e., a citation indicator, data processor 6 might assign an importance factor of 10 on a scale of 1 to 10 to the citation indicator. Similarly, if database access and collection device 4 determines that the patent was searched in only one class for the class indicator, data processor 6 might assign a 1 on a scale of 1 to 10 to the class indicator. Note that currently, both the class and citation indicators have the same relative importance. As discussed above, data processors 6 determines the 10 value for the citation indicator and the 1 value for the class factor by comparing the indicators to predetermined indicators having predetermined values. These predetermined indicators are based upon collected known indicators from known intellectual property portfolios.

The determined worth indicators are then transmitted to an indicator weighing device 8 which prioritizes each of the indicators against each other based upon predetermined weighing schemes which have been determined from known portfolios by also consulting empirical database 12. For example, the citation indicator may be more important, for example twice as important, than the class indicator based upon predetermined experience.

The weighted indicators are transmitted to indicator comparing device 10 which compares the collection of worth indicators to known collections of worth indicators from known intellectual property portfolios by consulting database 12 storing the empirical data. Known distribution or estimation techniques could be used to determine the closest matching known intellectual property portfolio to the intellectual property portfolio which is to be acquired. Finally, the system would output the known value for which the portfolio to be acquired matches the most signifying a rough approximation of the worth of the portfolio to be acquired. The output may be displayed on any display, such as the display systems for electronic data processing equipment in U.S. Pat. No. 3,820,080, incorporated herein by reference.

In addition to the above features, the present invention also includes the feature of manual assistance processing in the event the process of the present invention fails for known or unknown reasons. Accordingly, when a failure occurs, a notice is generated to a predetermined location where manual assistance may be performed. Each of data input device 2, database access and collection device 4, data processor 6, indicator weighing device 8, indicator comparing device 10 are programmed to output manual assistance requests to different locations or the same location depending on whether the manual work force must be spread over more than one location. Thus, the present invention is also able to effectively correct failures in the processing of the intellectual property portfolio in order that the process continue to determine an intellectual property portfolio worth indicator. Thus, manual assistance may be performed for different aspects of the processing, and the processing may be restarted in a standard manner for the determination of the intellectual property worth indicator.

Advantageously, the present invention also utilizes comparison techniques using neural network pattern matching processes. The specific types of pattern matching techniques implemented by the comparison system/device which have already been tested and shown to provide excellent results are the standard Kohonan and the Back Propagation neural networks, see, for example, U.S. Pat. Nos. 5,146,541 and 5,303, 330, incorporated herein by reference. However, other pattern matching techniques could also be used, depending on the required application. In each type of comparison, a neural network is selected that is suitable to the requirements of the application. The Kohonan and Back Propagation networks are discussed below.

The Kohonan neural network is useful in grouping similar patterns. The primary benefit of the Kohonan neural net as the basis for finding duplicate information is that it does not require training. The neural network is built and the categories are created as the entries are provided to the Kohonan neural net. When a Kohonan neural network was used with the Neural Pattern described earlier in connection with FIG. 18, effective results are provided for small population sizes.

In a Kohonan neural network each entry is fed into the network and a value is returned. By keeping track of the output numbers, entries with similar output numbers are grouped as similar. One disadvantage of the Kohonan neural network is that it may be moderately slow and is somewhat ineffective using large populations of entries. That is, as the number of entries in the system increases, its ability to effectively group similar data decreases.

The Back Propagation neural network is a trainable network. Using this method the entries are fed into the network in a first pass, which creates the neural pattern. Then a second pass is made with each entry to determine which values are to be compared. The second pass thereby indicates to what extent the current entry matches any of the entries in the population. There is a guarantee that the entry will at least match on itself within the population.

The Back Propagation network is created by creating an input/output array with as many slots as there are entries. For example, if there are 2000 entries in the population, then a 2000 slot input/output array is created. For each entry that is entered into the Back Propagation network, a second array is provided indicating which entry in the sequence it is. The first entry in the input/output array is indicated by setting the first slot to 1 and the remaining slots to 0. The second entry is indicated by setting the second slot to 1 and the remaining slots to 0, and so on.

When the entire Back Propagation network is trained with the entries, a second pass is made to evaluate each entry against the population. In the evaluation phase, each entry is passed through the network along with an empty input/output array. The Back Propagation network fills in the array with a value between 0 and 1 for each slot. A value of 1 indicates an exact match and a value of 0 indicates no match whatsoever. By scanning the input/output array for each entry in this manner, a table can be built of each entries comparative value with all the entries in the population. Any threshold can be set to consider a match relevant as potential duplicate or fraudulent data. For example, a 0.5 can be considered a relevant match. In this case if an entry matches any other with a value of 0.5 or greater, it is considered a potential duplicate.

The advantages of the Back Propagation network are that it provides a relative ranking of entries and their matches with other entries in a population, and that it can easily be extended to other types of comparison-related applications. As compared with the Kohonan, this neural net method provides a value that indicates the extent one entry matches another. This can be used to provide different thresholds for indicating a match. This method can also be used for a wide variety of comparison-related problems. In cases where a match on similar values is required without necessarily grouping items, this method can be used as opposed to the Kohonan. For example, in many companies there is a need to find employees that are acting as vendors to the company, since this is likely a conflict and may potentially be the basis of fraud. However, the name, address, social security number or other information of how the employee is registered as a vendor will likely be varied from the way the employee is registered as an employee (e.g., in the human resource system). To find such conflicts a Back Propagation network can be built using the entries of the human resource system, i.e., the employee database. Then, each entry of the vendor database can be used to find whether there is a relative match in the employee database. Since the entries are translated into one of the neural-based patterns, the Binomial neural network will identify similar entries and match on employees that have slightly altered their identification as vendors in the vendor system.

Kohonan and Back Propagation Neural Networks are standard and may be implemented by, for example, NEUROWINDOWS: Neural Network Dynamic Link Library, manufactured by Ward Systems Group, Inc., the manual of which is incorporated herein by reference. Similar networks are also disclosed, for example, in Caudill, M., The Kohonan Model, Neural Network Primer, AI Expert, 1990, 25-31; Simpson, P., Artificial Neural Systems, New York, N.Y., Pergamon Press, 1990; Wasserman, P., Neural Computing Theory and Practice, New York, N.Y., Van Nostrand Reinhold, 1989; Specht D. and Shapiro, P., Generalization Accuracy of Probalisitic Neural Networks Compared With Back-Propagation Networks, Proceedings of the International Joint Conference on Neural Networks, Jul. 8-12, 1991, 1, 887-892, all of which are incorporated herein by reference.

Figure 3:
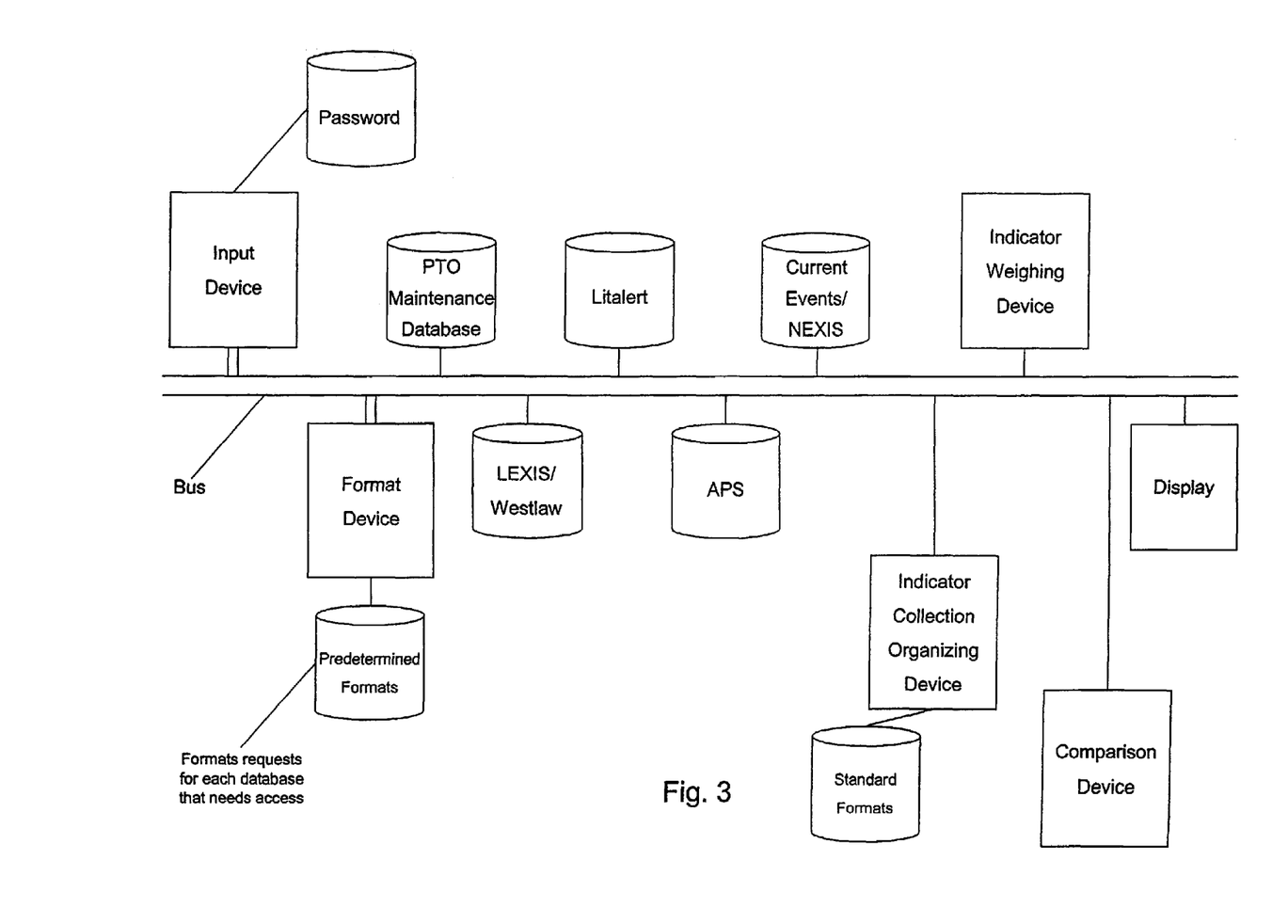
FIGS. 3-6 are block diagrams illustrating additional embodiments of the pattern matching system.
Figure 4:
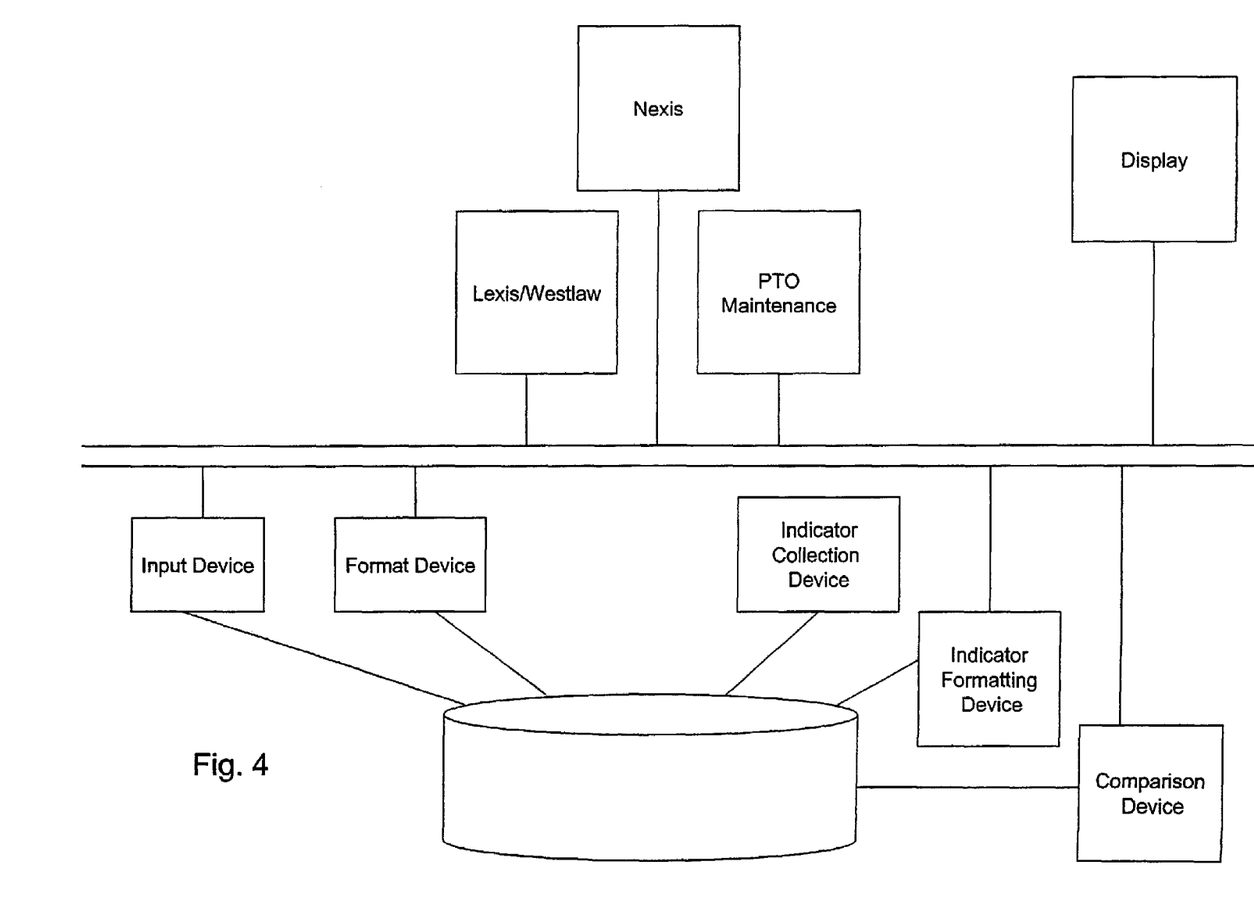
Figure 5:
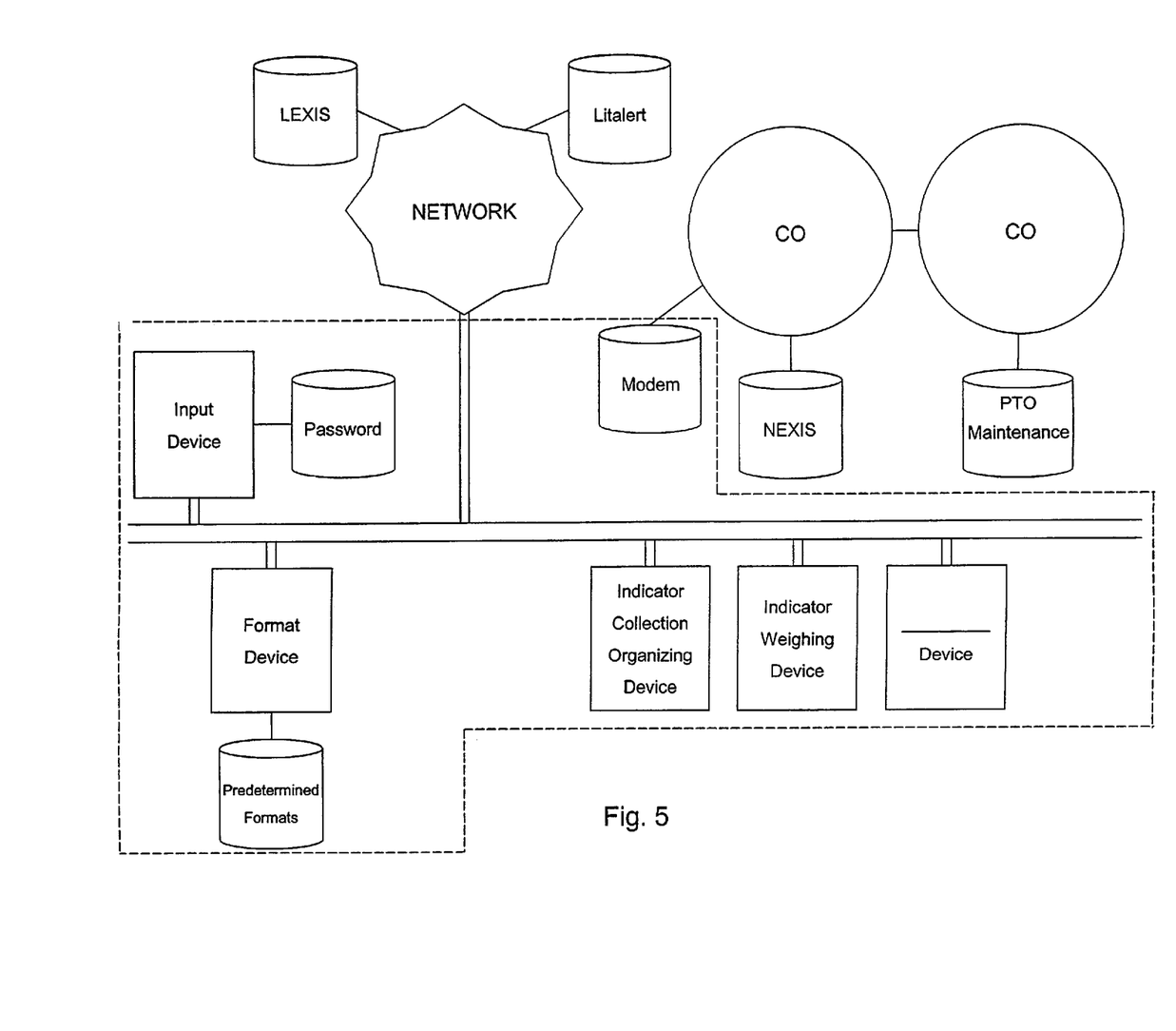
Figure 6:
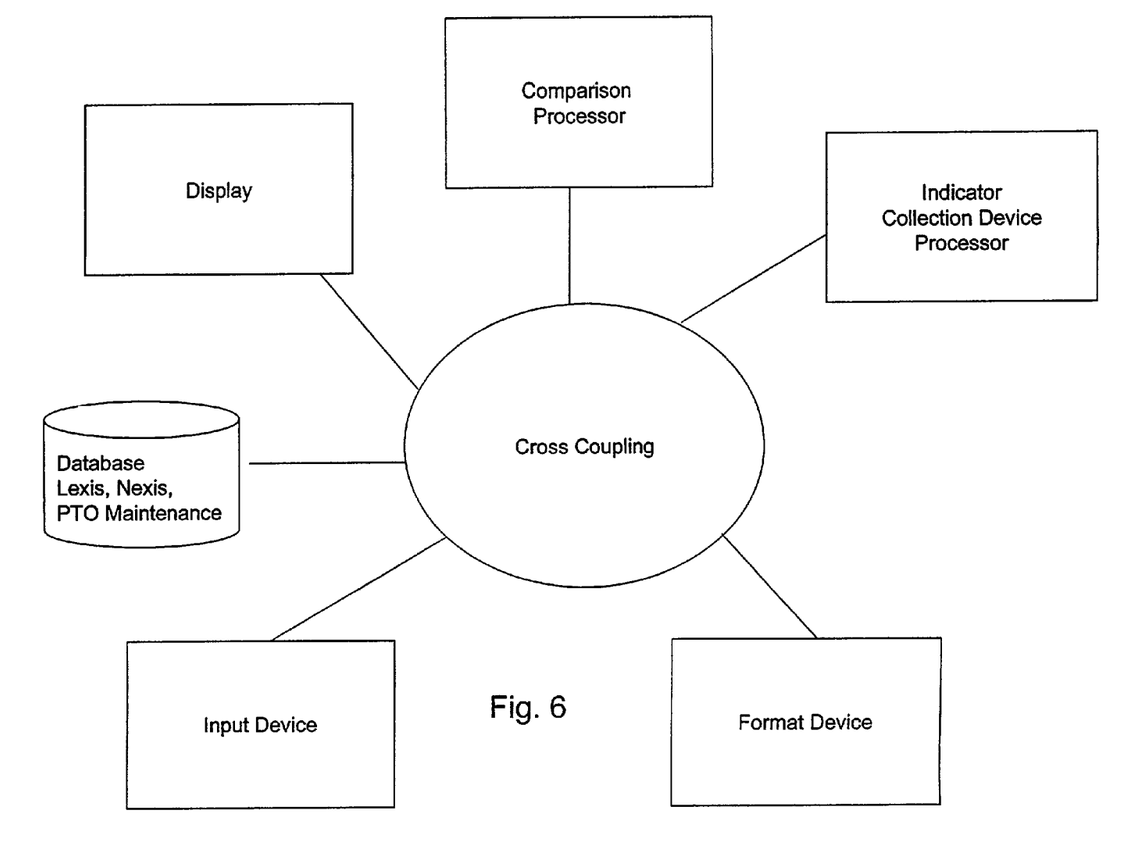

FIGS. 3-6 are block diagrams illustrating additional embodiments of the pattern matching system. In these embodiments, the hardware configuration is arranged according to the multiple instruction multiple data (MIMD) multiprocessor format for additional computing efficiency. FIG. 3 uses a more distributed database approach, whereas FIG. 4 uses a central database. FIG. 5 uses a similar approach across a public switched telephone network, and FIG. 6 uses a distributed approach where the different systems are cross coupled in a standard fashion. The details of this form of computer architecture are disclosed in greater detail in, for example, U.S. Pat. No. 5,163,131, Boxer, A., Where Buses Cannot Go, IEEE Spectrum, February 1995, pp. 41-45; and Barroso, L. A. et al., RPM: A Rapid Prototyping Engine for Multiprocessor Systems, IEEE Computer February 1995, pp. 26-34, all of which are incorporated herein by reference.

Figure 7:
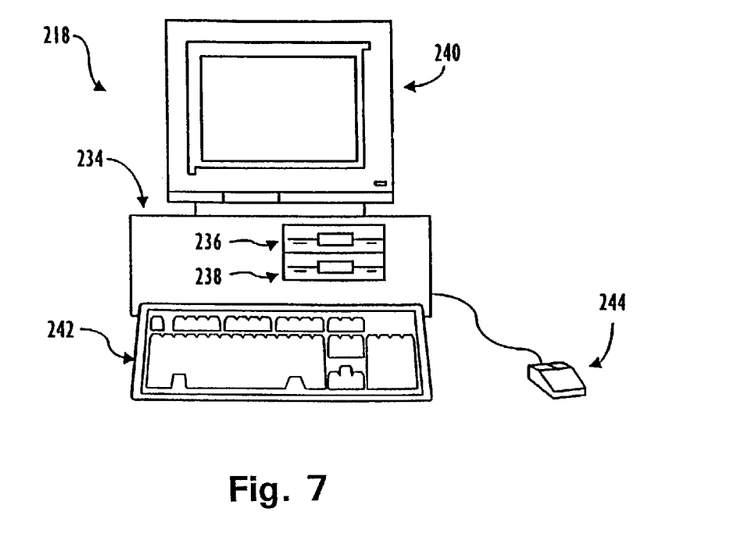
FIG. 7 is an illustration of a main central processing unit for implementing the computer processing.

FIG. 7 is an illustration of main central processing unit 18 for implementing the computer processing in accordance with one embodiment of the present invention. In FIG. 7, computer system 218 includes central processing unit 234 having disk drives 236 and 238. Disk drive indications 236 and 238 are merely symbolic of the number of disk drives which might be accommodated in this computer system. Typically, these would include a floppy disk drive such as 236, a hard disk drive (not shown either internally or externally) and a CD ROM indicated by slot 238. The number and type of drives varies, typically with different computer configurations. The computer includes display 240 upon which information is displayed. A keyboard 242 and a mouse 244 are typically also available as input devices via a standard interface.

Figure 8:
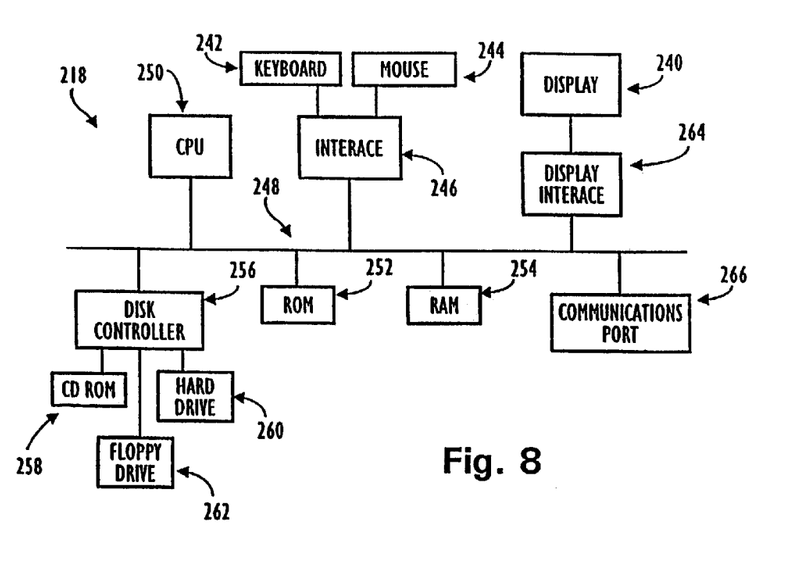
FIG. 8 is a block diagram of the internal hardware of the computer illustrated in FIG. 7.

FIG. 8 is a block diagram of the internal hardware of the computer 218 illustrated in FIG. 7. As illustrated in FIG. 8, data bus 248 serves as the main information highway interconnecting the other components of the computer system. Central processing units (CPU) 250 is the central processing unit of the system performing calculations and logic operations required to execute a program. Read-only memory 252 and random access memory 254 constitute the main memory of the computer, and may be used to store the simulation data.

Disk controller 256 interfaces one or more disk drives to the system bus 248. These disk drives may be floppy disk drives such as 262, internal or external hard drives such as 260, or CD ROM or DVD (digital video disks) drives such as 258. A display interface 264 interfaces with display 240 and permits information from the bus 248 to be displayed on the display 240. Communications with the external devices can occur on communications port 266.

Figure 9:
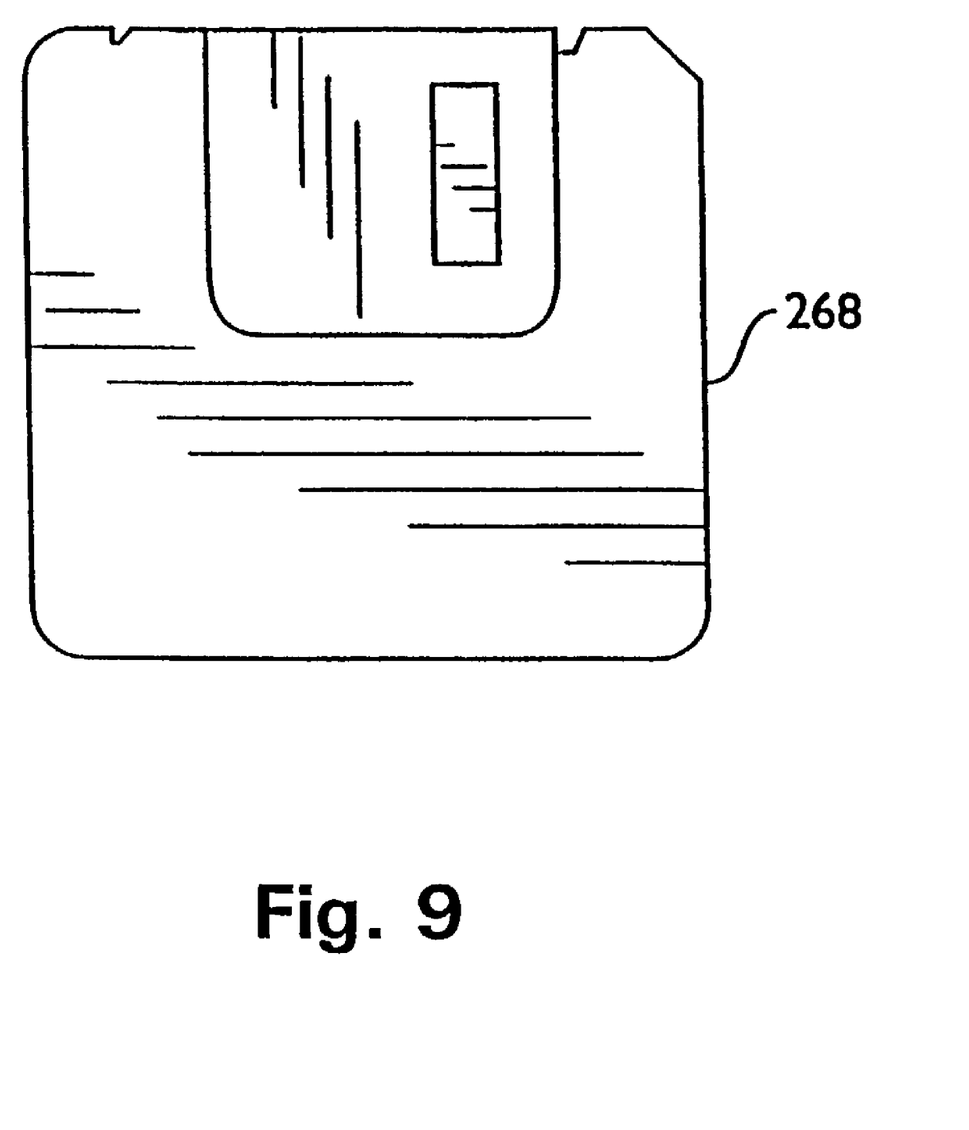
FIG. 9 is an illustration of an exemplary memory medium which can be used with disk drives illustrated in FIG. 7 or FIG. 8.

FIG. 9 is an illustration of an exemplary memory medium which can be used with disk drives such as 262 in FIG. 8 or 236 in FIG. 7. Typically, memory media such as a floppy disk, or a CD ROM, or a digital video disk will contain, inter alia, the program information for controlling the computer to enable the computer to perform the testing and development functions in accordance with the computer system described herein.

Finally, it should be noted that the various steps of the present invention are performed in hardware. Accordingly, each step of the present invention typically generates an electrical signal which represents a result of a specific step performed by each of the above elements in FIGS. 1 and 2. Accordingly, the above discussion represents the electrical signals which are generated and used in the various procedures of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer assisted process for determining an estimated value of an intellectual property portfolio, the process comprising the steps of:
   (a) storing, by a computer, first objectively determinable characteristics of representative intellectual property portfolios and objectively determinable values corresponding to each of the representative intellectual property portfolios and equivalents thereof, the first objectively determinable characteristics and the objectively determinable values forming a baseline against which to assess the estimated value of the intellectual property portfolio;
   (b) analyzing the intellectual property portfolio and equivalents thereof, to determine second objectively determinable characteristics of the intellectual property portfolio to be estimated;
   (c) deriving first information representing the second objectively determinable characteristics of the intellectual property portfolio to be estimated responsive to said analyzing step (b);
   (d) retrieving second information representing the first objectively determinable characteristics and the objectively determinable values of the representative intellectual property portfolios; and
   (e) comparing the first information received from said deriving step (c) to the second information received from said retrieving step (d) producing an estimated value of the intellectual property portfolio when the first information of the intellectual property portfolio is statistically similar to the second information of one of the representative intellectual property portfolios.

2. A computer assisted process for determining an estimated value of an intellectual property portfolio according to claim 1, wherein the intellectual property portfolio comprises at least one patent, trademark, trade secret and copyright intellectual property.

3. A computer assisted process for determining an estimated value of an intellectual property portfolio according to claim 1, wherein at least one of a patent database, a trademark database, a copyright database, a technical literature database, a legal reporter database, a current events database and an intellectual property status database are utilized to determine the estimated value of the intellectual property portfolio.

4. A computer assisted process for determining an estimated value of an intellectual property portfolio according to claim 1,
   wherein the intellectual property portfolio comprises a patent portfolio including patents, and
   wherein the first objectively determinable characteristics includes patent information derived from the patents in the patent portfolio comprising at least one of the following: number of claims, length of independent claims, number and dates of references cited, number of classes searched, legal status of the patents, number of years until each of the patents expire, group which examined each of the patents, domestic priority, and foreign priority.

5. A computer assisted process for determining an estimated value of an intellectual property portfolio according to claim 4, wherein the patent information further includes frequency with which the patents have been cited as references for other patents and additional variations under the Doctrine of Equivalents.

6. A computer assisted process for determining an estimated value of an intellectual property portfolio according to claim 1, further comprising the step of weighing each of the first and second objectively determinable characteristics according to predetermined weighing factors producing weighed first and second objectively determinable characteristics, and
   comparing the weighed first and second objectively determinable characteristics to determine the statistical similarity between the weighed first and second objectively determinable characteristics.

7. A computer assisted process for determining an estimated value of an intellectual property portfolio according to claim 1,
   wherein the intellectual property portfolio includes issued patents, and at least one of trademarks and copyrights and corresponding equivalents thereof, and
   wherein the first objectively determinable characteristics are derived by analyzing the issued patents, and the at least one of trademarks, trade secrets and copyrights.

8. A computer assisted process for determining an estimated value of an intellectual property portfolio according to claim 1, wherein the first information of the intellectual property portfolio is determined to be statistically similar to the second information of one of the representative intellectual property portfolios utilizing at least one of a curve fitting technique and a standard deviation technique.

9. A computer assisted process for determining an estimated value of an intellectual property portfolio according to claim 1,
   wherein the first objectively determinable characteristics include first valuation indicators, wherein the first valuation indicators are assigned an importance factor based upon predetermined criteria, and wherein the first valuation indicators are compared to the second objectively determinable characteristics and the estimated value of the intellectual property portfolio is determined responsive to the importance factor of each of the valuation indicators, including valuation indicators that provide substantially the same function in substantially the same way to achieve the same result.

10. A computer assisted process for determining an estimated value of an intellectual property portfolio according to claim 1, wherein the objectively determinable values of the representative intellectual property portfolios include objectively determinable monetary values and equivalents thereof.

11. A computer assisted process for determining an estimated value of an intellectual property portfolio according to claim 10, wherein the objectively determinable monetary values of the representative intellectual property portfolios are determined by at least one of prior adjudication, prior license values, prior purchase values and an accountant evaluation based upon generally acceptable accounting procedures (GAAP) of the representative intellectual property portfolios.

12. A computer assisted process for determining an estimated value of an intellectual property portfolio according to claim 1, wherein the first objectively determinable characteristics include at least one of prior adjudication values, prior license values, and prior purchase values.

13. A computer assisted process for determining an estimated value of an intellectual property portfolio using a computer processor system, the process comprising the steps of:
   (a) analyzing using the computer processor system the intellectual property portfolio and equivalents under the Doctrine of Equivalents;
   (b) deriving first information responsive to said analyzing step (a) based upon the intellectual property portfolio;
   (c) storing empirical data in a database;
   (d) retrieving, by the computer processor system, empirical data relating to known intellectual property portfolios stored in the database; and
   (e) comparing the first information derived in said deriving step (b) to the empirical data retrieved from said retrieving step (d) producing an estimated intellectual property worth indicator indicating the worth of the intellectual property portfolio.

14. A computer assisted process for determining an estimated value of an intellectual property portfolio according to claim 13, wherein the intellectual property portfolio comprises at least one patent, trademark, trade secret and copyright intellectual property.

15. A computer assisted process for determining an estimated value of an intellectual property portfolio according to claim 13, wherein at least one of a patent database, a trademark database, a copyright database, a legal reporter database, a technical literature database, a current events database and an intellectual property status database are utilized to determine the estimated intellectual property worth indicator of the intellectual property portfolio.

16. A computer assisted process for determining an estimated value of an intellectual property portfolio according to claim 13,
   wherein the intellectual property portfolio comprises a patent portfolio including patents, and
   wherein the first information includes patent information derived from the patents in the patent portfolio comprising at least one of the following: number of claims, length of independent claims, number and dates of references cited, number of classes searched, legal status of the patents, number of years until each of the patents expire, group which examined each of the patents, domestic priority, and foreign priority.

17. A computer assisted process for determining an estimated value of an intellectual property portfolio according to claim 16, wherein the patent information further includes frequency with which the patents have been cited as references for other patents.

18. A computer assisted process for determining an estimated value of an intellectual property portfolio according to claim 13, further comprising the step of weighing each of the first information and the empirical data according to predetermined weighing factors producing weighed first information and weighed empirical data respectively, and
   said comparing step (d) further comprises the step of comparing the weighed first information and the weighed empirical data to determine similarity there between to determine the estimated intellectual property worth indicator.

19. A computer assisted process for determining an estimated value of an intellectual property portfolio according to claim 13,
   wherein the intellectual property portfolio includes issued patents, and at least one of trademarks, trade secrets and copyrights, and
   wherein the first information are derived by analyzing the issued patents, and the at least one of trademarks and copyrights.

20. A computer assisted process for determining an estimated value of an intellectual property portfolio according to claim 13, wherein the first information of the intellectual property portfolio is determined to be statistically similar to the empirical data of the intellectual property portfolio utilizing at least one of a curve fitting technique and a standard deviation technique.

21. A computer assisted process for determining an estimated value of an intellectual property portfolio according to claim 13,
   wherein the first information includes first valuation indicators,
   wherein the first valuation indicators are assigned an importance factor based upon predetermined criteria, and
   wherein the first valuation indicators are compared to the empirical data and the estimated intellectual property worth indicator of the intellectual property portfolio is determined responsive to the importance factor of the first valuation indicators.

22. A computer assisted process for determining an estimated value of an intellectual property portfolio according to claim 13, wherein the first information of the intellectual property portfolio includes an objectively determinable monetary value.

23. A computer assisted process for determining an estimated value of an intellectual property portfolio according to claim 22, wherein the objectively determinable monetary value of the intellectual property portfolio is determined by at least one of prior adjudication, prior license values, prior purchase values and an accountant evaluation based upon generally acceptable accounting procedures (GAAP) of the intellectual property portfolio.

24. A computer assisted process for determining an estimated value of an intellectual property portfolio according to claim 13, wherein the first information includes at least one of prior adjudication values, prior license values, and prior purchase values.

25. A computer implemented process for determining an estimated value of an intellectual property portfolio, the process comprising the steps of:
  (a) analyzing the intellectual property portfolio, and equivalents thereof;
  (b) deriving first information responsive to said analyzing step (a) based upon the intellectual property portfolio, and equivalents thereof;
  (c) retrieving, by a computer from a first database, empirical data relating to known intellectual property portfolios, and equivalents thereof; and
  (d) comparing the first information derived in said deriving step (b) to the empirical data retrieved from said retrieving step (c) producing an intellectual property worth indicator indicating the worth of the intellectual property portfolio, and equivalents thereof,
  wherein the intellectual property includes information stored in at least one of the first database and a second database including at least one of a patent, a trademark, technical literature, a copyright, legal reporter information, current events, intellectual property status information and equivalents thereof.

26. A computer assisted process for determining at least one of a financial quality and financial quantity of an intellectual property portfolio, the process comprising the steps of:
  (a) analyzing the intellectual property portfolio stored in an intellectual property database;
  (b) deriving information responsive to said analyzing step (a) based upon the intellectual property portfolio;
  (c) retrieving, by a computer, quality data relating to known intellectual property portfolios; and
  (d) comparing the information derived in said deriving step (b) to the quality data retrieved from said retrieving step (c) to determine an intellectual property factor indicating the at least one of the financial quality and the financial quantity of the intellectual property portfolio and equivalents thereto.

27. A computer assisted process according to claim 26, wherein the intellectual property portfolio comprises at least one patent, trademark, trade secret and copyright intellectual property.

28. A computer assisted process according to claim 26, wherein at least one of a patent database, a trademark database, a copyright database, a legal reporter database, a technical literature database, a current events database and an intellectual property status database are utilized to determine the at least one of the financial quality and the financial quantity of the intellectual property portfolio.

29. A computer assisted process according to claim 26,
  wherein the intellectual property portfolio comprises a patent portfolio including patents, and
  wherein the information includes patent information derived from the patents in the patent portfolio comprising at least one of the following: number of claims, length of independent claims, number and dates of references cited, number of classes searched, legal status of the patents, number of years until each of the patents expire, group which examined each of the patents, domestic priority, and foreign priority.

30. A computer assisted process according to claim 29, wherein the patent information further includes frequency with which the patents have been cited as references for other patents.

31. A computer assisted process according to claim 26, further comprising the step of weighing each of the information and the quality data according to predetermined weighing factors producing weighed information and weighed empirical data respectively, and said comparing step (d) further comprises the step of comparing the weighed information and the weighed empirical data to determine similarity there between to determine the estimated intellectual property worth indicator.

32. A computer assisted process according to claim 26,
  wherein the intellectual property portfolio includes issued patents, and at least one of trademarks, trade secrets and copyrights, and
  wherein the information are derived by analyzing the issued patents, and the at least one of trademarks and copyrights.

33. A computer assisted process according to claim 26, wherein the at least one of the financial quality and the financial quantity of the intellectual property portfolio is derived substantially independent of accounting valuation techniques including cost, market and income approaches.

34. A computer assisted process according to claim 26, wherein the information of the intellectual property portfolio is determined to be statistically similar to the quality data of the intellectual property portfolio utilizing at least one of a curve fitting technique and a standard deviation technique.

35. A computer assisted process according to claim 26, wherein the information includes valuation indicators,
  wherein the valuation indicators are assigned an importance factor based upon predetermined criteria and equivalents thereof, and
  wherein the valuation indicators are compared to the quality data and the at least one of the financial quality and the financial quantity of the intellectual property portfolio is determined responsive to the importance factor of the valuation indicators.

36. A computer assisted process according to claim 26, wherein the information of the intellectual property portfolio includes an objectively determinable monetary value.

37. A computer assisted process according to claim 36, wherein the objectively determinable monetary value of the intellectual property portfolio is determined by at least one of prior adjudication, prior license values, prior purchase values and an accountant evaluation based upon generally acceptable accounting procedures (GAAP) of the intellectual property portfolio.

38. A computer assisted process according to claim 26, wherein the information includes at least one of prior adjudication values, prior license values, and prior purchase values.

* * * * *